July 13, 1965 C. HERFURTH 3,194,374
MACHINE TOOL SLIDE RETRACTION MECHANISM
Filed June 5, 1963 5 Sheets-Sheet 1

INVENTOR.
CHARLES HERFURTH
BY
ATTORNEYS

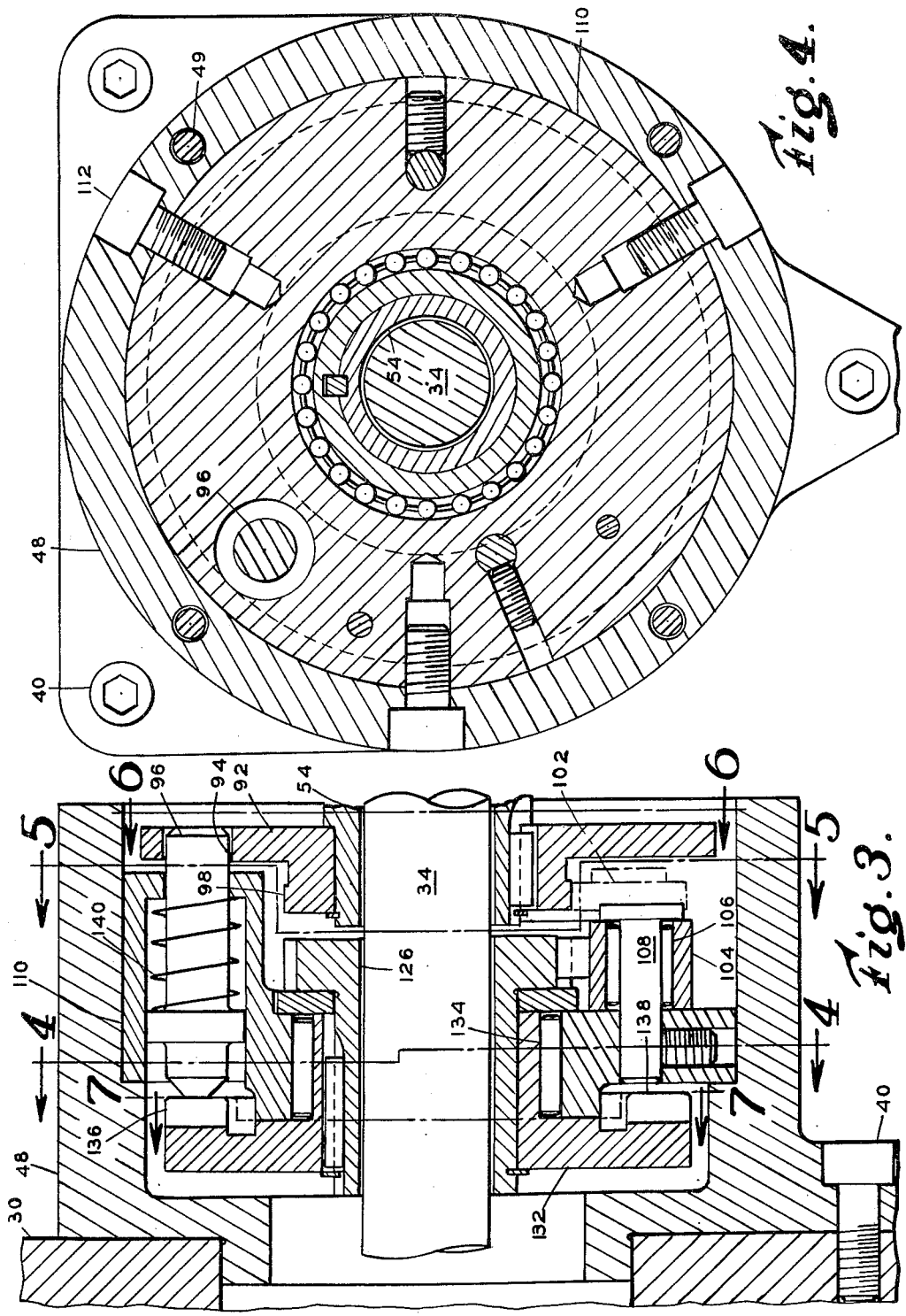

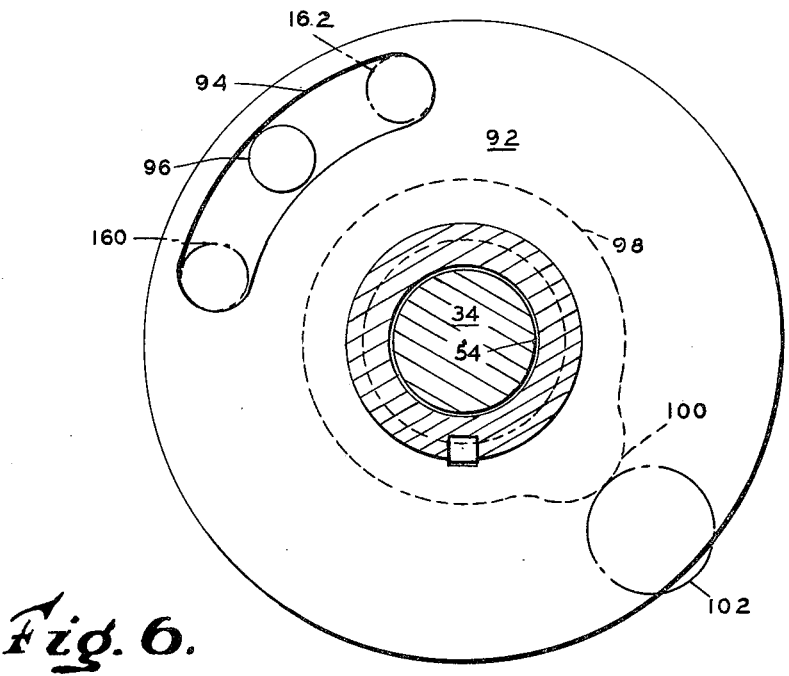
Fig. 6.
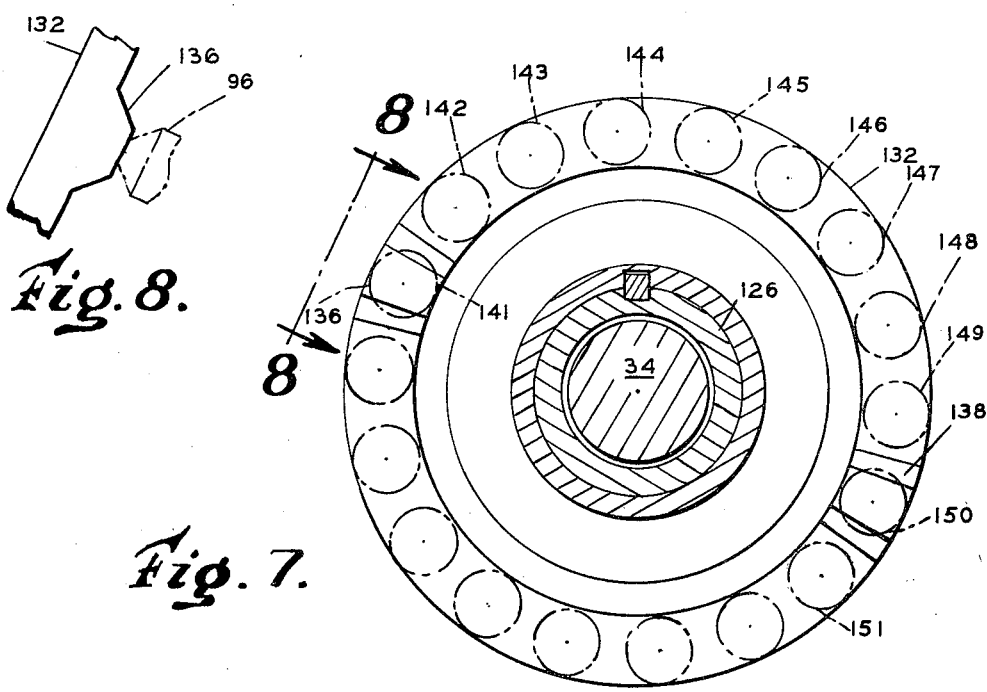
Fig. 8.
Fig. 7.

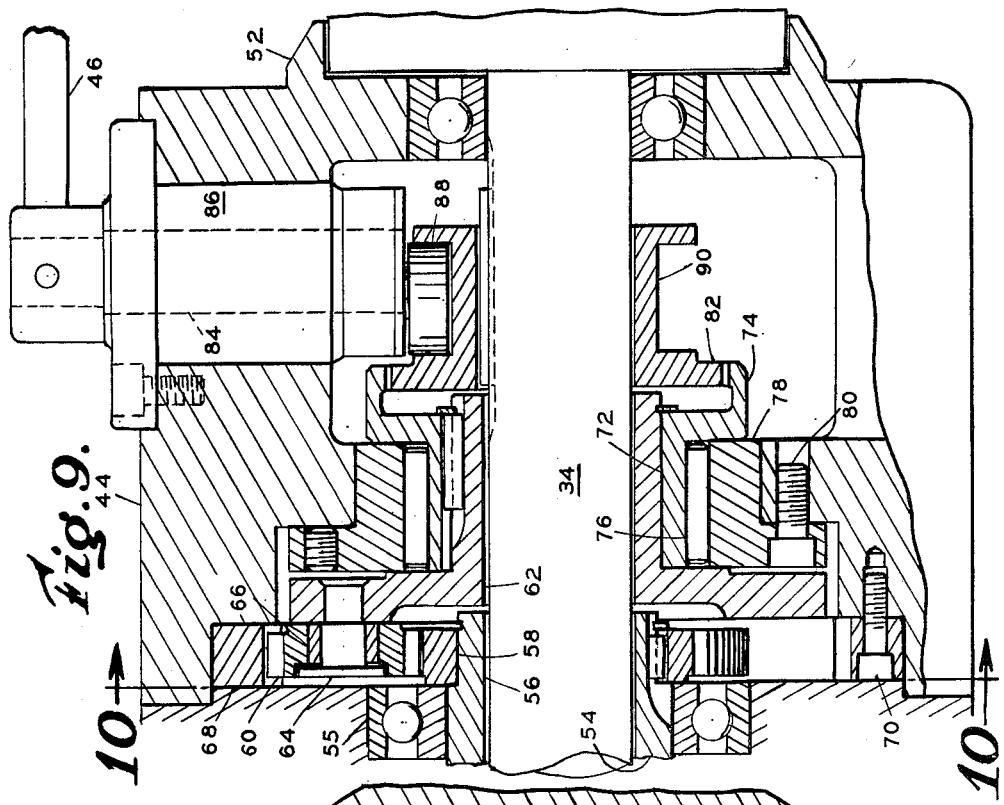
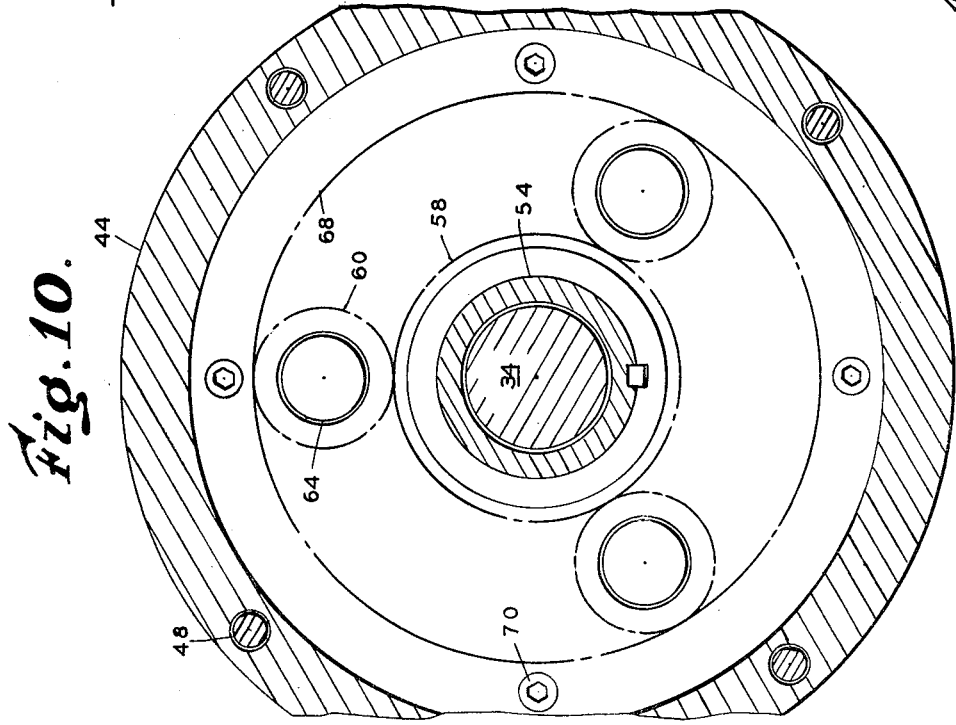

United States Patent Office 3,194,374
Patented July 13, 1965

3,194,374
MACHINE TOOL SLIDE RETRACTION
MECHANISM
Charles Herfurth, Cincinnati, Ohio, assignor to The
Cincinnati Milling Machine Co., Cincinnati, Ohio, a
corporation of Ohio
Filed June 5, 1963, Ser. No. 286,146
7 Claims. (Cl. 192—143)

This invention relates to a machanism which is reversely operable to move a slide through a preset distance, and more particularly it relates to a mechanism adapted to shift a heavy machine tool slide through a predetermined short reversible retraction stroke.

It is known that during the use of a knee and column milling machine to perform a cutting operation, the machine parts are sprung slightly due to reaction forces between a cutter and workpiece such that the cutter and workpiece are moved a small distance apart. In order to rapidly return the workpiece, which is normally supported on a worktable, to its starting position after a completed cut when these reaction forces are not present, it is necessary to shift the worktable away from the cutter slightly to prevent cutter drag on the machined surface of the workpiece, the result of which otherwise would be undesirable scoring of the work and often cutter damage. Various attachment mechanisms have been developed heretofore to produce the retraction of the worktable during the return movement and to reset the worktable at its starting position when the return is completed. These mechanisms have been adequate where the mass moved is comparatively small and the direction of movement has been other than vertical. However, there is a need for a more powerful unit in order to move the slide of a larger size of machine, such as a knee and column miller on which a massive cast iron housing or other similar workpiece is to be machined. In machines of this nature, the knee, saddle and table assembly, all of which must be moved together as a unit, often weigh considerably in excess of a ton. In addition, the workpiece supported thereon may also weigh over a ton and in the larger applications, several tons. The retraction unit must be capable of accurately lowering and then returning the knee quickly through a fixed vertical stroke. The space limitations for the unit are stringent and it must be kept as small as possible. Ideally such a unit is in the form of an attachment which can be added when desired to a standard machine and since the knee of a milling machine is a crowded place without the addition of a retraction mechanism, it is best provided as an external attachment. Even when added externally, it must be kept as small as possible since it should not interfere with the machine operator's access to the machine's working surfaces and control members.

It is therefore an object of this invention to provide a compact retraction mechanism for a machine tool that is capable of moving a heavy load accurately through a reciprocal stroke.

It is also an object of this invention to provide a retraction mechanism which is in the form of an easily applied machine attachment.

It is a further object to provide a retraction mechanism which can be attached externally to a milling machine knee.

Another object of this invention is to provide a recording mechanism by which a range of multiple shaft rotations can be controlled and limited between accurately fixed extremes of angular movement of the shaft.

Still another object of this invention is the use of a reversible, multi-turn, rotary motor to secure an accurate reciprocal retraction stroke of a machine tool slide.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, the retraction mechanism combines a reversible rotary motor and a geared speed reducer mechanism, the latter of which is connectable to a hand control shaft that operates through a conventional mechanism to move a machine slide when the control shaft is rotated. The mecahnism also includes a revolution counting unit which mechanically registers the extent of rotation of the motor output drive into the speed reducer unit and accurately stops the motor at the same extreme position at each end of the angular range over which the motor is operated repeatedly to produce a corresponding predetermined amount of rotation of the hand control shaft. This predetermined rotation of the hand control shaft one way and the other produces a corresponding reciprocal movement of the slide. The speed reducer and revolution counting mechanisms are enclosed in housings which, with the motor, are connected together to form an integral retraction unit and this unit is adapted to be received over the end of the hand control shaft such that the shaft extends through all of them. That is, the motor, speed reducer and revolution counting mechanisms are all received around the hand control shaft and are axially aligned thereon.

A clear understanding of this invention can be obtained from the following detailed description in which reference is made to the attached drawings wherein:

FIG. 3 is a longitudinal section of the revolution counting mechanism included in the mechanism of FIG. 2.

FIG. 4 is a section of the mechanism of FIG. 3 on line 4—4 thereof.

FIG. 6 is a view of the mechanism of FIG. 3 from line 6—6.

FIG. 7 is a section of the mechanism of FIG. 3 on line 7—7.

FIG. 8 is a partial side view of the members of FIG. 7 from line 8—8.

FIG. 9 is a longitudinal section of the speed reducer mechanism portion of FIG. 2.

FIG. 10 is a section of the mechanism of FIG. 9 on line 10—10 thereof.

Figure 1:
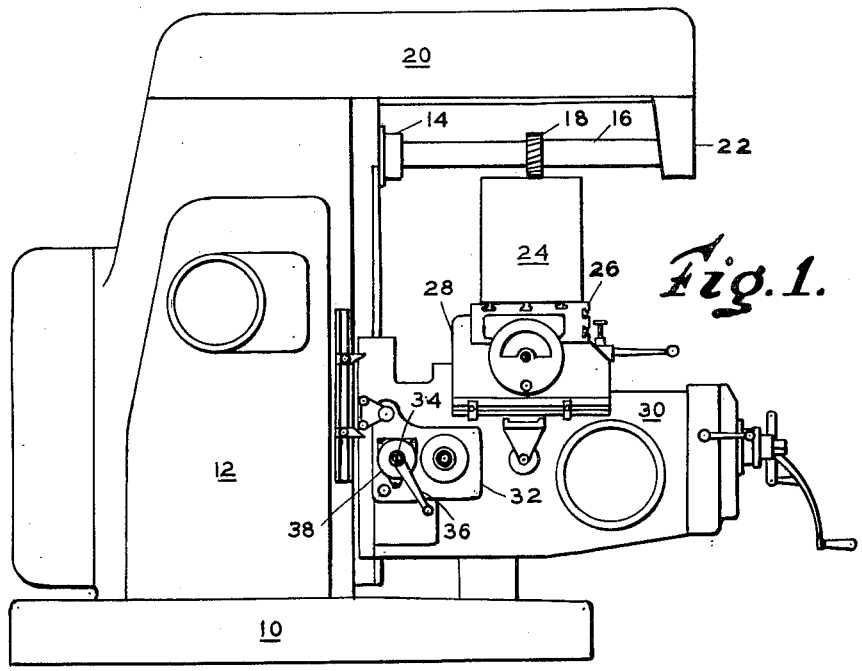
FIG. 1 is a side elevation view of a knee and column milling machine.

A typical knee and column milling machine is shown in FIG. 1. The machine includes a base 10 from which a column 12 rises vertically. The column 12 houses a rotatable spindle 14 to which an arbor 16 can be attached and a cutting tool 18 is fixed on the arbor 16. An overarm 20 is attached across the top of the column 12 and extends outward over the arbor 16. The outer end of the overarm 20 has an arbor support member 22 in which the outer end of the arbor 16 is journalled for rotation. The cutting tool 18 is adapted to perform a machining operation on a large workpiece 24 which is supported thereunder on a worktable 26. The worktable 26 is movable forth and back under the cutter 18 by a shift of the worktable 26 on a saddle member 28. The saddle member 28 in turn is supported on a knee member 30 and is movable thereon toward and away from the column 12 on an axis perpendicular to the direction of movement of the worktable 26. The knee 30 is vertically movable along the column 12 to provide the depth of cut adjustment of the workpiece 24 in the type of milling operation set-up depicted. The machine shown in FIG. 1 is a well known type and the various mechanical drive systems utilized to provide the described motions of the machine members are well known in the art and need not be described in detail herein. The machine also includes a rear control station 32 at which a hand control drive shaft 34 is located and rotation of this shaft produces vertical movement of the knee 30. A crank handle 36 is attachable to the shaft 34 to provide manual means for rotating this shaft.

Figure 2:
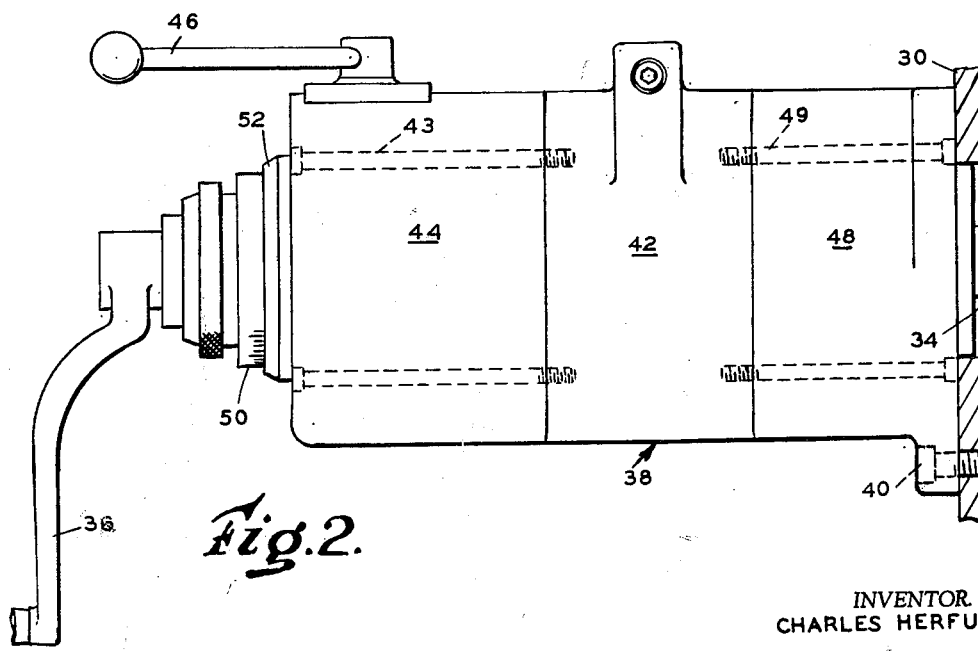
FIG. 2 is a view in elevation of the retraction mechanism of this invention for application on the machine of FIG. 1.
Figure 11:
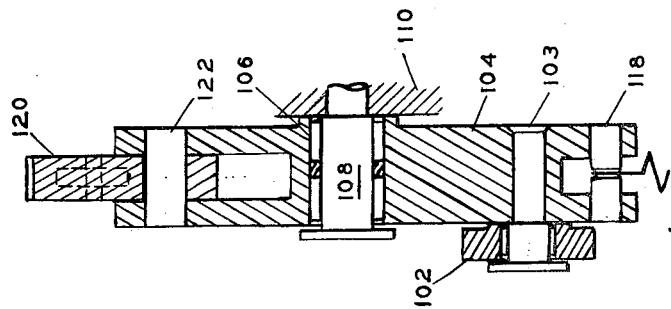
FIG. 11 is a section of the mechanism shown in FIG. 5 on line 11—11 in that figure.

In the embodiment of the invention described herein, the knee retraction mechanism is connected to the standard machine as an attachment 38 applied to the control shaft 34 which is slightly elongated so that the attachment unit 38 can be received thereover between the crank 36 and the knee 30 to which the unit 38 is attached by means of machine screws 40, FIG. 2. The unit 38 is comprised of three parts. The first is a fluid motor 42 which can be of any well known type that will operate to produce multiple rotations of an output shaft selectively in either direction. A speed reducer unit housing 44 is attached to the motor 42 by bolts 43 and this includes gearing, to be described subsequently, which is connectable by operation of a control lever 46 to rotate the hand control drive shaft 34 in response to the operation of the motor 42 at a rate greatly reduced from the revolution output of the motor. The third part of the unit 38 is included in a housing 48 and also is attached directly to the motor 42 by bolts 49. This unit includes a mechanical system which counts the output revolutions of the motor 42 and after a predetermined number of revolutions in one direction from a starting point, the unit causes the motor to stall and prevents further rotation in that one direction. The counting mechanism also counts the reverse rotation and when an equal number of revolutions has occurred in the reverse direction, it again operates to stall the motor to prevent further rotation beyond the starting point. Thus the mechanism of the unit 48 defines a range of angular operation of the motor 42 by establishing exact extreme points between which the motor may be operated. As will be seen from the detailed description later herein, the unit 48 allows for multiple rotations of the output drive from the motor 42. The drive shaft 34 extends from the knee 30 through the entire unit 38 and the crank 36 is attachable to the extreme end thereof beyond a dial collar 50 having graduation marks therearound which are referenced to an index point on a beveled annular projection 52 on the speed reducer unit housing 44.

The mechanism of the speed reducer unit 44 is shown in detail in FIGS. 9 and 10. An output shaft 54 is rotated in a bearing 55 at one end of the motor 42 when the motor is operated. The output shaft 54 has a bore 56 through it and the hand control drive shaft 34 extends axially therethrough without a driving engagement therebetween. A gear 58 is fixed on the end of the shaft 54 extending into the housing 44. The gear 58 is in mesh with each of three orbital pinions 60 which in turn are rotatably secured to a member 62 by means of pins 64 and bushings 66. The member 62 is loosely received around the shaft 34 for rotation relative thereto. The pinions 60 are also in mesh with a ring gear 68 that is fixed in the housing 44 by screws 70. A member 72 is attached to rotate with the pinion carrying member 62 and includes an internal gear portion 74. The member 72 is rotatable on needle type roller bearings 76 which are received in a ring 78 secured in the housing 44 by screws 80. Due to the orbital gear drive arrangement, the gear 74 is rotated at a speed greatly reduced from the speed at which the shaft 54 rotates. A gear 82 is received on the shaft 34 for rotation therewith and for axial movement therealong selectively to effect engagement with and disengagement from the internal gear 74. Shifting of the gear 82 in and out of mesh with the gear 74 is accomplished manually by swinging the lever 46 to rotate a shaft 84 to which it is attached. The shaft 84 is journalled through a bushing 86 fixed in the housing 44 and a roller 88 is eccentrically attached to the lower end of the shaft 84. The roller 88 is closely received in a necked portion 90 extending from the gear 82. Thus the lever 46 when swung moves the gear 82 axially along the shaft 34 due to the eccentric location of the roller 88 on the shaft 84. The lever 46 is then operated to connect and disconnect the retraction mechanism for movement of the knee 30.

Figure 5:
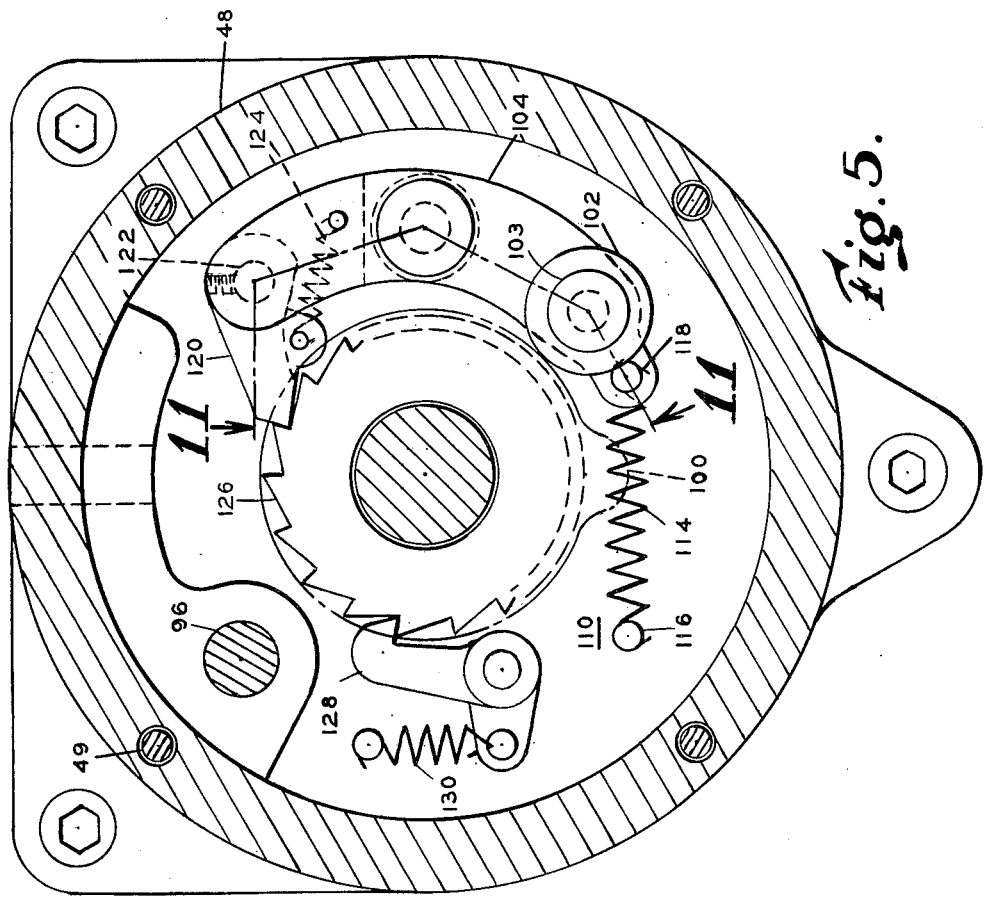
FIG. 5 is also a section of the mechanism of FIG. 3 on line 5—5.

The mechanism of the revolution counting unit 48 is shown in detail in FIGS. 3 through 8 and FIG. 11. As shown in FIG. 3, the unit 48 is attached directly to the knee 30 by the screws 40 and the hand control drive shaft 34 extends loosely through the mechanism without a driving connection. The end of the motor output shaft 54 opposite the speed reducer unit 44 extends into the counting unit 48. A stop plate 92 is fixed to the end of the shaft 54 for rotation therewith. The stop plate 92 has an arcuate opening 94 therein, FIG. 6, and this opening is adapted to receive the end of a positive stop 96 which stops the rotation of the output shaft 54 and stalls the motor 42 when the stop 96 is extended for engagement therein. The stop plate also includes a ratchet cam portion 98 which has a single lobe 100 that engages a roller 102. The roller 102 is rotatably fixed on a pin 103 in the end of a lever 104 (see FIGS. 5 and 11). The lever 104 is rotatably received over bearings 106 on a pin 108 that is fixed in a member 110 secured in the housing 44 by screws 112, FIG. 4. The lever 104 is constantly biased by a spring 114 received between a pin 116 in the fixed member 110 and a pin 118 in the end of the lever 104 adjacent the roller 102. The other end of the lever 104 carries a pawl 120 fixed over a rotatable axle 122 and is biased by a spring 124 to pivot into engagement with a toothed ratchet wheel 126. An escapement lever 128 is pivotally fixed in the member 110 and is turned by a spring 130 to engage the teeth of the ratchet wheel 126. As can be seen in FIG. 5, where the cam lobe 100 is shown in phantom for illustration, when the stop plate 92 and shaft 54 are rotated in either direction, the lobe 100 will operate to turn the lever 104 counter-clockwise momentarily. The pawl 120 then pushes the wheel 126 counter-clockwise a step and the back slope of a tooth of the wheel turns the lever 128 outward to allow that tooth to pass thereunder. The escapement lever 128 holds the ratchet wheel 126 as the lever 104 is turned back to the position shown during which return the pawl 120 passes over the back slope of a tooth to prepare for another incremental movement of the wheel 126. It can be seen that the ratchet wheel 126 rotates in the same direction regardless of the direction of rotation of the stop plate 92 and shaft 54.

FIG. 3 shows that the ratchet wheel 126 is attached to rotate with an annularly shaped cam 132 which is received in roller bearings 134 in the fixed member 110. The cam 132 is shown in more detail in FIGS. 7 and 8. The cam face is planar except for two rises or lobes 136, 138 which are located in diametrically opposed positions on the cam 132. The positive stop member 96, shown best in FIG. 3, is axially movable through the fixed member 110 and is held in contact with the cam 132 by a spring 140 which tends to retract the stop 96 from the plate 92. The positive stop 96 is shifted against the spring bias to its extended position by the cam lobes 136, 138 when they are rotated to an effective position in registration with the positive stop 96.

The described combination of ratchet mechanism, cam and positive stop operate to control the amount of movement of the shaft 34 by controlling and limiting the rotation of the motor output shaft 54. The operation of the retraction mechanism can be described best with reference to FIGS. 6 and 7. Assume that clockwise rotation of the shaft 34 produces an upward movement of the knee 30 while counter-clockwise rotation causes a downward movement. Through operation of the drive gearing from the motor output shaft 54 to the drive shaft 34, the output shaft 54 and drive shaft 34 both rotate in the same direction but at different rates. Assume that the knee 30 is just nearing the end of the reset stroke upward after retraction. The shaft 54 and the plate 92 attached thereon are rotating clockwise. Just prior to the end of the reset, the lobe 100 is turned as shown in FIG. 6 to move the roller 102 outward to shift the cam 132 such that the lobe 136 is moved counter-clockwise into registration with the stop 96. The stop 96 and cam 132 are then in the relative position indicated by the phantom circle 141. The stop 96 is then in the extended position and its end extends into the opening 94 in the plate 92. The plate and shaft can continue to rotate clockwise only until the plate 92 and stop 96 are in the relative position indicated in phantom at 160 when the stop 96 stalls the motor 42 and prevents further rotation of the output shaft 54. This additional rotation is about thirty degrees and carries the lobe 100 beyond the roller 102. The knee 30 is in the raised or reset position at this time and the rotation of the shafts 34, 54 and retraction drive members is stopped. Before any additional movement can be obtained, the motor 42 must be reversed to move the plate 92 counter-clockwise.

At the end of a cutting operation prior to the return of the workpiece 24 below the cutter 18 the motor 42 is energized to rotate the shafts 34 and 54 counter-clockwise to produce a retraction of the workpiece 24 from the cutter 18. The plate 92 is rotated away from the stop 96 such that the stop 96 is centrally located in the opening 94 and the lobe 100 is again at the roller 102. The cam 126 is indexed one position counter-clockwise and the stop 96 and cam 126 are in the relative position indicated at 142. The lobe 136 is moved away from its effective position in registration with the stop 96 which is retracted and the shaft 54 and plate 92 can rotate freely. The motor 42 will continue to rotate its output shaft 54 and for each rotation thereof, the cam 132 will be stepped one incremental position counter-clockwise as viewed in FIG. 7. The relative positions 143 through 149 will be successively moved to alignment with the positive stop 96. When the position 149 is in registration with the stop 96, the shaft 54 has completed seven full revolutions plus the initial thirty degrees of movement. At the end of the eighth revolution, the cam location 150 is turned into registration with the stop 96 and the lobe 138 at that position pushes the stop 96 into the central area of the slot 94. The shaft 54 and stop plate can rotate an additional thirty degrees counter-clockwise at which time the stop 96 and plate 92 are relatively positioned as at 162 and further counter-clockwise rotation is prevented and the motor 42 is stalled. The output shaft has rotated eight full revolutions plus sixty additional degrees. This produces a predetermined rotation of the shaft 34 depending on the gear ratios of the spaced reduction unit 44 and the rotation effects a corresponding lowering of the knee 30.

The worktable 26 is now moved back to its starting location on the saddle 28 to return the workpiece 24 below the cutter 18 without its dragging thereagainst. When the worktable 26 is returned, the motor 42 is energized to rotate the shaft 54 in the reverse or clockwise direction as viewed in FIGS. 6, 7. This allows the stop 96 and plate 92 to move from the stall engagement at 162. Again the lobe 100 is brought back to move the roller 102 outward after the first thirty degrees of clockwise movement. The cam 132 is rotated counter-clockwise so that position 151 is in registration with the stop 96. During the reset of the worktable 26, eight full additional rotations of the cam 132 are produced to bring the position 141 back in registration with the stop 96. At this time, the lobe 136 again shifts the stop 96 to its extend position and after an additional thirty degrees of rotation of the shaft 54, the stop 96 and plate 92 coact to stall the motor 42. The shaft 54 has rotated in the reverse direction a total of eight full revolutions plus sixty degrees and the knee 30 is elevated back to the original position. Since a gear reduction mechanism is used, the torque available on the shaft 34 to raise the knee is high and the load lifted can be correspondingly heavy.

It is apparent from the description that the cam 132 may have only one lobe and in such a case, the one lobe would operate to advance the stop 96 to define alternately each extreme of the angular range over which the shaft 54 can be rotated. Likewise, the cam 132 may have any number of lobes in an equispaced arrangement therearound and these will produce the alternate definition of the extremes of the angular range over which the shaft 54 can be rotated by the motor 42. The spacing of the ratchet teeth and the swing of the lever 104 determine the number of full revolutions available between the times that a lobe of the cam 132 is moved to an effective position in registration with the stop 96 to advance it into the plate 92. In any case of one or several equispaced lobes, the mechanism will produce exactly the same rotation in one direction and the other.

While the invention has been shown and described with reference to one possible form or embodiment thereof, it is to be understood that the present disclosure is illustrative rather than restrictive and that changes and modifications may be resorted to without departing from the spirit of the invention or the scope of the claims which follow.

What is claimed is:

1. In a machine tool having a reciprocally movable slide and a drive shaft operatively connected to the slide for movement thereof when rotated, a retraction mechanism to produce reversible movement of said slide through a predetermined distance comprising in combination:
    (a) a reversibly operable rotary motor having an output shaft,
    (b) a speed reducer mechanism connected to said output shaft and the slide drive shaft for rotation of the slide drive shaft at a rate reduced from the speed of said output shaft,
    (c) a revolution counting mechanism including
        (1) an annular and unidirectionally rotatable cam having an actuating lobe extending therefrom, and
        (2) a ratchet mechanism responsive to a revolution of the output shaft in either direction to rotate said cam from one to another of a series of predetermined angular positions whereby said actuating lobe is cyclicly moved to and from an effective position, and
    (d) a positive stop engaged by said actuating lobe in the effective position and shifted thereby to an extended position wherein said positive stop prevents continued rotation of the output shaft without reversal of the direction of rotation thereof to limit the extent of slide movement to the predetermined distance.

2. In combination with a reversible motor having a rotatable output shaft, a control mechanism operable to limit the extent of rotation of the shaft between two extreme angular positions thereof separated by a plurality of revolutions of said output shaft, the mechanism comprising:
    (a) an annular and unidirectionally rotatable cam having,
        (1) an actuating lobe extending therefrom,
    (b) a ratchet mechanism responsive to a predetermined amount of angular movement of the output shaft in either direction to rotate said cam from one to another of a series of predetermined angular positions whereby said actuating lobe is cyclicly moved to and from an effective position, and (c) a positive stop engaged by said actuating lobe in the effective position and shifted thereby to an extended position wherein said positive stop prevents continued rotation of the output shaft without reversal of the direction of rotation thereof.

3. In combination with a reversible motor having a rotatable output shaft, a control mechanism operable to limit the extent of rotation of the shaft between two extreme angular positions thereof separated by a plurality of revolutions of said output shaft, the mechanism comprising:
   (a) an annularly shaped, unidirectionally rotatable cam having
       (1) a plurality of actuating lobes equiangularly located therearound,
   (b) a ratchet mechanism responsive to each revolution of the output shaft in either direction to rotate said cam from one to another of a series of predetermined angular positions whereby said actuating lobes are each cyclicly moved to an effective position,
   (c) a stop member attached to the output shaft, and
   (d) a positive stop including yieldable means for bias thereof to a retracted position away from an extended position in which said positive stop is adapted to engage said stop member to stall operation of the motor in either direction, each of said actuating lobes in the effective position adapted to engage and move said positive stop against said bias means to the extended position thereof for alternately stopping the output shaft in one and the other of the extreme angular positions thereof.

4. In a milling machine having a vertically movable knee and a hand control shaft extending therefrom for movement thereof when rotated, a power retraction mechanism for reversible movement of the knee through a short predetermined stroke comprising in combination:
   (a) a reversible motor having an output shaft rotatable thereby, said output shaft having a bore through which the hand control shaft is loosely received,
   (b) a speed reducer mechanism connected to the output shaft and received over the hand control shaft and including means selectively to connect the hand control shaft thereto for rotation at a speed reduced from that of the output shaft when said motor is operated,
   (c) a rotation counting mechanism connected to said output shaft and received around the hand control shaft axially in line with said motor and speed reducer unit, said counting mechanism having a positive stop actuated thereby to stop rotation of said output shaft at each extreme of a range of rotational movement whereby the knee is reversely movable through a corresponding predetermined distance when the speed reducer is connected to the hand control shaft.

5. The mechanism of claim 4 wherein:
   (a) said speed reducer and rotation counting mechanisms are each enclosed in a housing and said housings and motor are connected together to form an integrated retraction unit, and
   (b) said unit is fixed to the knee over the hand control shaft.

6. In a machine tool having a reciprocally movable slide and a drive shaft operatively connected to the slide for movement thereof when rotated, a retraction mechanism to produce reversible movement of the slide through a predetermined distance comprising in combination:
   (a) a reversibly operable rotary motor having an output shaft,
   (b) a speed reducer mechanism connected to said output shaft and the slide drive shaft for rotation of the slide drive shaft at a rate reduced from the speed of said output shaft, and
   (c) a revolution counting mechanism connected to said output shaft and operable to limit rotation thereof to an amount corresponding to movement of the slide drive shaft between two predetermined angular positions, the counting mechanism including
       (1) an annularly shaped and rotatable cam having an actuating lobe extending therefrom,
       (2) means for rotating said cam in one direction from one to another of a series of uniformly spaced incremental positions in response to a fixed amount of rotation of said output shaft in either direction,
       (3) a positive stop engaged by said cam actuating lobe when said cam is in a predetermined one of said incremental positions and moved thereby to an extended position, and
       (4) means for connecting said positive stop to stall said motor in either direction when said positive stop is in the extended position thereof.

7. The mechanism of claim 6 wherein:
   (a) said means for connecting the positive stop to stall said motor is a stop member fixed to said output shaft,
   (b) said positive stop in the extended position coacts with said stop member to stall said motor,
   (c) bias means are provided for yieldably holding said positive stop in a disengaged position spaced from said extended position wherein said stop member and positive stop cannot coact, and
   (d) movement of said cam to the predetermined one of said incremental positions moves said actuating lobe to engage and move said positive stop to the extended position thereof.

References Cited by the Examiner
UNITED STATES PATENTS

| | | | |
|---|---|---|---|
| 2,727,613 | 12/55 | Radkowski | 192—138 |
| 2,907,225 | 10/59 | Pischke | 192—139 |
| 2,967,463 | 1/61 | Jensen. | |
| 3,091,987 | 6/63 | Wallis | 192—139 |
| 3,106,997 | 10/63 | White | 192—138 |

DAVID J. WILLIAMOWSKY, *Primary Examiner.*